(No Model.)
M. A. DEES.
Device for Converting Motion.
No. 236,310. Patented Jan. 4, 1881.
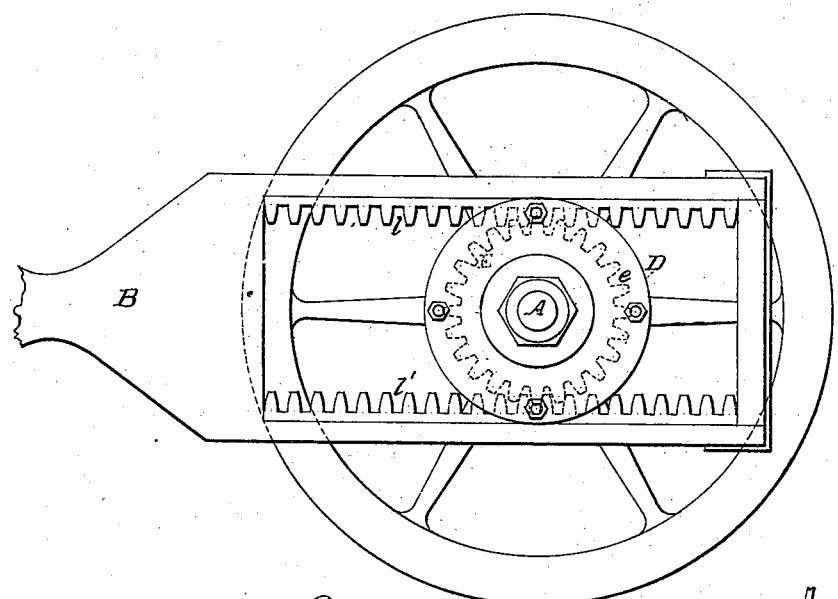
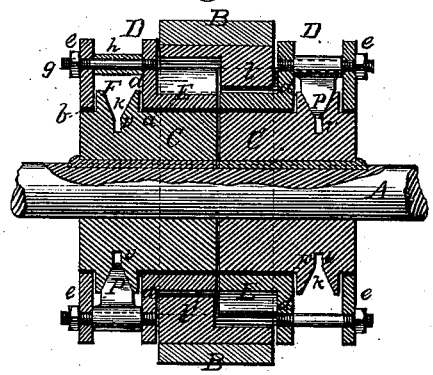
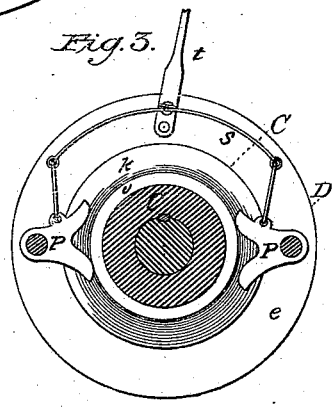
WITNESSES:
INVENTOR:
Mark A. Dees,
by E. W. Anderson,
his ATTORNEY.

UNITED STATES PATENT OFFICE.

MARK A. DEES, OF SCRANTON, MISSISSIPPI.

DEVICE FOR CONVERTING MOTION.

SPECIFICATION forming part of Letters Patent No. 236,310, dated January 4, 1881.

Application filed September 11, 1880. (No model.)

*To all whom it may concern:*

Be it known that I, MARK A. DEES, of Scranton, in the county of Jackson and State of Mississippi, have invented a new and valuable Improvement in Means for Converting Reciprocating into Rotary Motion; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of this invention. Fig. 2 is a central vertical section, and Fig. 3 is a sectional view taken through one of the channeled grooves.

This invention has relation to means for converting reciprocating into rotary motion; and it consists in the construction and novel arrangement, in connection with a rack-pitman embracing a shaft and having its racks arranged on opposite sides above and below said shaft, of two bearings keyed on said shaft and having outer and inner marginal rabbets and circumferential V-form grooves, recessed in channel form in their bottoms, a flanged rack-boxing on each bearing working on the rabbets, and reversible branched or butterfly pawls carried by the flanged boxing and engaging the grooves of the bearings, all as hereinafter shown and described.

In the accompanying drawings, the letter A designates the shaft to which rotary motion is designed to be communicated, the pitman B having a rectilinear reciprocating motion, derived from a steam-cylinder or other source.

C C indicate two circular bearings, which are keyed side by side on the shaft, in rigid connection therewith. Each of these bearings is rabbeted on its inner margin at $a$ and on its outer margin at $b$, in circular or journal form, to receive one section of the rack-boxing D, which consists of an inner circular rack, E, having a marginal flange, $d$, to keep it in proper engagement with the pitman-rack, and an outer flange, $e$, the flanges $d$ and $e$ being connected and braced in position by means of bolts $g$, having sleeves $h$, which are interposed between said flanges, so that each rack-boxing is complete in itself and moves freely on the rabbeted bearings to which it is applied. The rack portion of each boxing is on the inner side thereof, and while one rack, E, engages a rack, $l$, on one side of the pitman and on its upper branch, the other circular rack engages the rack $l'$ on the other side of the pitman and on its lower branch, as shown in the drawings. Between the rabbets of each bearing C is a rib, F, which is circumferentially grooved in V form, and this groove $k$ is made with a small channel in its bottom, as shown at $v$. These bottom-channeled grooves are designed to engage firmly by a wedging action with the pawls P, which are also V form in cross-section, and usually made in branched or butterfly form, as shown in the drawings, for convenience in reversing, one or more of said pawls being employed for each groove, according to the character of the work to be performed by the engine and the amount of friction necessary to prevent slipping in this portion of the mechanism. These pawls are pivoted on the bolts connecting the flanges $d$ and $e$ of the boxing, and are provided with springs $s$, also connected to the boxing and serving to press the pawls into the grooves in such a manner as to cause a frictional engagement when the circular racks are turned in one direction, while allowing a disengagement when said racks are turned in the opposite direction. Usually the spring is so arranged in connection with a pair of butterfly-pawls that its force can be applied to one or the other branch of each pawl, the change being effected by a lever, $t$, which is pivoted to the boxing, and to which the spring is connected, as shown in the drawings. By reversing the lever, so as to release the engaged branches and bring the other branches of the pawls into action, the direction of rotation of the shaft will be reversed.

This device is designed especially for use in connection with machines and engines in which it is desired to maintain a powerful action in a sustained manner, such as mining-engines and locomotives working on heavy grades. The rack-connection between the pitman and boxings is perfectly secure, and the pawls and the V form channeled grooves effect a certain and firm engagement, so that the devices are safe and efficient.

I am well aware that reciprocating pitmen having upper and lower racks on opposite sides for engagement with circular racks are not new, and that pawl-and-ratchet devices, as well as friction-pawls, are common in devices for converting reciprocating into rotary motion, and I do not therefore claim such devices broadly.

What I claim, and desire to secure by Letters Patent, is—

The device for converting reciprocating into rotary motion, consisting of the bearings C C, keyed side by side on the shaft, their outer and inner marginal rabbets $b$ $a$, and intermediate rib F, having the V form bottom-channeled groove $k$ $v$, the rack-boxings D D, having the flanges $d$ $d$ and the outer flange, $e$, journaled on the rabbets of the bearings C C, the bolts $g$, sleeves $h$, pawls P, springs $s$, and pitman B, having its upper and lower racks on opposite sides, substantially as specified.

In testimony that I claim the above I have hereunto subscribed my name in the presence of two witnesses.

MARK A. DEES.

Witnesses:
 PHILIP C. MASI,
 M. P. CALLAN.